US012476030B2

(12) United States Patent
Kaimai et al.

(10) Patent No.: US 12,476,030 B2
(45) Date of Patent: Nov. 18, 2025

(54) ANNULAR MAGNETIC BODY FOR NOISE CONTROL AND MEMBER FOR NOISE CONTROL

(71) Applicant: KABUSHIKI KAISHA RIKEN, Tokyo (JP)

(72) Inventors: Nozomu Kaimai, Tokyo (JP); Daisuke Ishihara, Tokyo (JP); Koushi Hashimoto, Tokyo (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 18/998,122

(22) PCT Filed: Jul. 27, 2022

(86) PCT No.: PCT/JP2022/029030

§ 371 (c)(1), (2) Date: Jan. 24, 2025

(87) PCT Pub. No.: WO2024/023999

PCT Pub. Date: Feb. 1, 2024

(65) Prior Publication Data

US 2025/0266194 A1 Aug. 21, 2025

(51) Int. Cl.

*H01F 17/06* (2006.01)
*H01F 1/153* (2006.01)

(52) U.S. Cl.

CPC ......... *H01F 1/15333* (2013.01); *H01F 17/06* (2013.01); *H01F 2017/065* (2013.01)

(58) Field of Classification Search

CPC ........... H01F 1/15333; H01F 2017/065; H01F 2017/067

(Continued)

(56) References Cited

U.S. PATENT DOCUMENTS 5,291,172 A 3/1994 Ito et al.
2020/0335276 A1 10/2020 Na et al.

FOREIGN PATENT DOCUMENTS

CN 107256792 A 10/2017
CN 113557580 A 10/2021

(Continued)

OTHER PUBLICATIONS

Jan. 28, 2025, International Preliminary Report on Patentability issued in the International Patent Application No. PCT/JP2022/029030.

(Continued)

*Primary Examiner* — Tuyen T Nguyen
(74) *Attorney, Agent, or Firm* — KENJA IP LAW PC

(57) ABSTRACT

A split-type annular magnetic body for noise control, which has been difficult to produce with Fe-based nanocrystalline alloys, is provided and obtains an excellent noise reduction effect. The annular magnetic body for noise control includes thin strips of soft magnetic metal laminated along a radial direction and is used by having a cable inserted therethrough. The annular magnetic body for noise control includes a plurality of split pieces divided into a non-annular shape and is used by placing split surfaces of the split pieces in contact with each other to form an annular shape. The product FL×Hc of the flatness FL of the split surfaces and the coercivity Hc of the split pieces is 7.0 μm·A/m or less. The flatness FL is the sum of absolute values of the maximum value and the minimum value of a cross-sectional curve measured in accordance with JIS B 0601:2001.

3 Claims, 4 Drawing Sheets

(58) Field of Classification Search
USPC .................................................. 336/175–176
See application file for complete search history.

(56) References Cited

FOREIGN PATENT DOCUMENTS

| | | | | |
|---|---|---|---|---|
| EP | 2958116 | A1 | | 12/2015 |
| EP | 3312854 | A1 | | 4/2018 |
| JP | S5976409 | A | | 5/1984 |
| JP | H0927412 | A | | 1/1997 |
| JP | 2992269 | B1 | | 12/1999 |
| JP | 2001052945 | A | | 2/2001 |
| JP | 2001068364 | A | | 3/2001 |
| JP | 2001085233 | A | | 3/2001 |
| JP | 2003115692 | A | * | 4/2003 |
| JP | 2006324562 | A | * | 11/2006 |
| JP | 6137408 | B2 | | 5/2017 |
| JP | 2019121749 | A | | 7/2019 |
| JP | 2021125567 | A | | 8/2021 |
| WO | 2014126220 | A1 | | 8/2014 |
| WO | 2021157165 | A1 | | 8/2021 |
| WO | 2021200514 | A1 | | 10/2021 |

OTHER PUBLICATIONS

Oct. 18, 2022, International Search Report issued in the International Patent Application No. PCT/JP2022/029030.
Oct. 18, 2022, Written Opinion of the International Searching Authority issued in the International Patent Application No. PCT/JP2022/029030.
Apr. 10, 2025, Office Action issued by the China National Intellectual Property Administration in the corresponding Chinese Patent Application No. 202280098270.3.
Jun. 24, 2025, the Extended European Search Report issued by the European Patent Office in the corresponding European Patent Application No. 22953092.8.

* cited by examiner

ANNULAR MAGNETIC BODY FOR NOISE CONTROL AND MEMBER FOR NOISE CONTROL

TECHNICAL FIELD

The present disclosure relates to an annular magnetic body for noise control and a member for noise control.

BACKGROUND

Conventionally, a member for noise control that includes an annular magnetic body and a core case that houses the annular magnetic body is known for reducing the noise current propagating in a cable plugged into an electronic device.

Patent literature (PTL) 1 describes a configuration of a split-type ferrite core in which a ring-shaped ferrite core is split into semicircular shapes that can directly sandwich a power cable. Such a split-type member for noise control can be attached to a connected cable and thus offers superior convenience compared to a non-split-type ferrite core, in which the ring-shaped ferrite core is not split.

PTL 2 describes a core with an Fe-based nanocrystalline alloy ribbon wound thereon and a manufacturing method thereof. A non-split-type annular magnetic body using an Fe-based nanocrystalline alloy has superior impedance characteristics over a wide frequency range compared to a ferrite core, resulting in significant noise reduction.

CITATION LIST

Patent Literature

PTL 1: JP 2992269 B2
PTL 2: JP 6137408 B2

SUMMARY

Technical Problem

However, since Fe-based nanocrystalline alloys are made of layers of highly brittle thin metal strips, these alloys are easily chipped and are limited in shape when molded. Consequently, there are no split-type annular magnetic bodies for noise control that use nanocrystalline alloys. Nanocrystalline alloy cores therefore could not be used as easily as split-type ferrite cores.

It is an aim of the present disclosure to provide a split-type annular magnetic body for noise control, which has been difficult to produce with Fe-based nanocrystalline alloys, and to obtain an excellent noise reduction effect.

Solution to Problem

We Provide the Following.

[1] An annular magnetic body for noise control including thin strips of soft magnetic metal laminated along a radial direction, the annular magnetic body being used by having a cable inserted therethrough, wherein the annular magnetic body for noise control includes a plurality of split pieces divided into a non-annular shape and is used by placing split surfaces of the split pieces in contact with each other to form an annular shape, and a product FL×Hc of a flatness FL of the split surfaces and a coercivity Hc of the split pieces is 7.0 μm. A/m or less, where the flatness FL is a sum of absolute values of a maximum value and a minimum value of a cross-sectional curve measured in accordance with JIS B 0601:2001.

[2] The annular magnetic body for noise control according to [1], wherein an arithmetic mean roughness Ra and a maximum height roughness Rz of the split surfaces satisfy Ra≤0.7 μm and Rz≤10 μm, respectively.

[3] The annular magnetic body for noise control according to [1] or [2], wherein a radial crushing strength is 50 MPa or more.

[4] The annular magnetic body for noise control according to any one of [1] to [3], wherein an impedance relative permeability μrz at a frequency of 100 kHz is 6000 or more.

[5] The annular magnetic body for noise control according to any one of [1] to [4], wherein the thin strips of soft magnetic metal include an Fe-based nanocrystalline alloy.

[6] A member for noise control including:

the annular magnetic body for noise control according to any one of [1] to [5]; and a split-type core case in which subcases formed by dividing a cylinder into a non-annular shape are connected in an openable and closable manner to form a cylindrical shape, the subcases storing the split pieces of the annular magnetic body for noise control one by one, wherein when the split-type core case is closed, the split surfaces of the split pieces come in contact with each other inside the split-type core case to form the annular magnetic body for noise control, and a surface pressure on the split surfaces is 0.05 MPa or more.

Advantageous Effect

According to the present disclosure, a split-type annular magnetic body for noise control, which has been difficult to produce with Fe-based nanocrystalline alloys, can be provided, and an excellent noise reduction effect can be obtained.

DETAILED DESCRIPTION

The present disclosure is described below in detail. In the present specification, a numerical value range represented by "-" means a range that includes the numerical values listed before and after the "-" as the lower and upper limits.

[Annular Magnetic Body for Noise Control]

An annular magnetic body for noise control in the present disclosure is an annular magnetic body for noise control including thin strips of soft magnetic metal laminated along a radial direction, the annular magnetic body being used by having a cable inserted therethrough, wherein the annular magnetic body for noise control includes a plurality of split pieces divided into a non-annular shape and is used by placing split surfaces of the split pieces in contact with each other to form an annular shape, and a product FL×Hc of a flatness FL of the split surfaces and a coercivity Hc of the split pieces is 7.0 μm. A/m or less, where the flatness FL is the sum of absolute values of the maximum value and the minimum value of a cross-sectional curve measured in accordance with JIS B 0601:2001.

Figure 1:
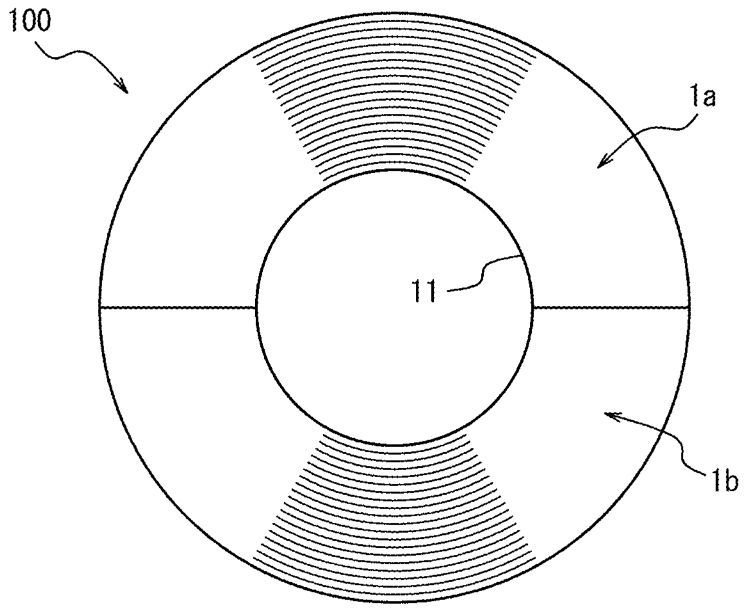
FIG. 1 is a top view of an example of an annular magnetic body for noise control.
Figure 2:
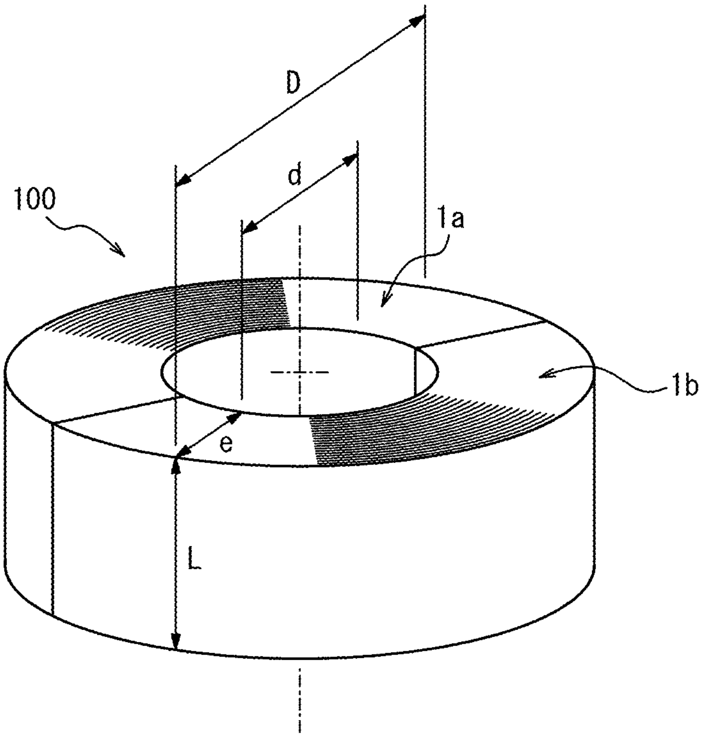
FIG. 2 is a perspective view of an example of an annular magnetic body for noise control.

FIG. 1 is a top view of an annular magnetic body for noise control 100 according to an embodiment of the present disclosure. FIG. 2 is a perspective view of the annular magnetic body for noise control 100 according to an embodiment of the present disclosure. As illustrated in these figures, the annular magnetic body for noise control 100 is annular in overall shape and includes thin strips of soft magnetic metal laminated along the radial direction. The annular magnetic body for noise control 100 includes a plurality of split pieces 1*a*, 1*b* divided into a non-annular shape. In the example illustrated in FIGS. 1 and 2, the annular magnetic body for noise control 100, which is annular in overall shape, is split in half along the central axis direction. As illustrated in FIGS. 1 and 2, the split surfaces of the plurality of split pieces 1*a*, 1*b* are placed in contact with each other to form an annular shape, and a cable is inserted through a hollow section 11 defined by the annular magnetic body for noise control 100.

Since Fe-based nanocrystalline alloys are a laminate of thin strips of soft magnetic metal with high brittleness, they are limited in shape when molded, are easily chipped, and are difficult to handle. It has therefore been difficult to provide a split-type annular magnetic body for noise control 100 using an Fe-based nanocrystalline alloy. Even if a split-type annular magnetic body for noise control 100 was produced using an Fe-based nanocrystalline alloy, the high brittleness led to inadequate control of the split surfaces, and a sufficient noise reduction effect could not be obtained.

After independent and diligent study, we discovered that controlling the surface roughness of the split surfaces and the coercivity of the split pieces so that the product FL×Hc of the flatness FL of the split surfaces and the coercivity Hc of the split pieces 1*a*, 1*b* is 7.0 μm·A/m or less yields an excellent noise reduction effect with the impedance relative permeability μrz at a frequency of 100 kHz being 6000 or more. We thereby developed the present annular magnetic body for noise control 100. To obtain a better noise reduction effect, the product FL×Hc of the flatness FL of the split surfaces and the coercivity Hc of the split pieces 1*a*, 1*b* is preferably 6.5 μm·A/m or less and more preferably 2.0 μm·A/m or less. The lower limit of the product FL×Hc of the flatness FL of the split surfaces and the coercivity Hc of the split pieces is not particularly limited but is preferably 0.005 μm·A/m or more based on the relationship with the lower limits of flatness and coercivity, as described below.

Figure 7:
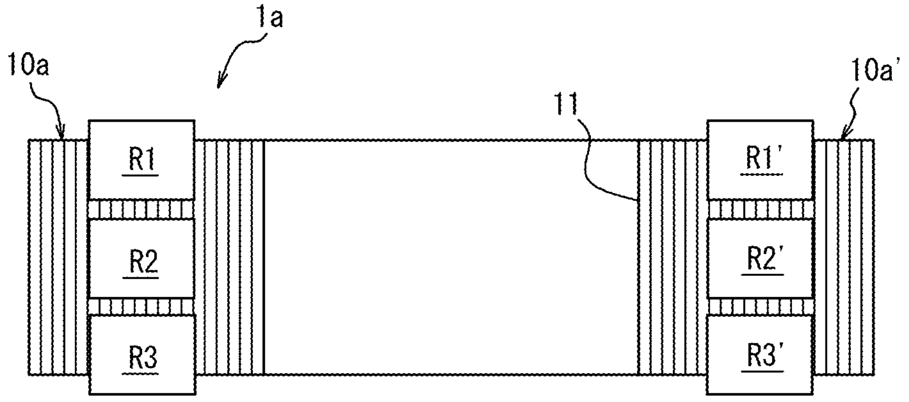
FIG. 7 is a diagram illustrating a method of measuring flatness, arithmetic mean roughness Ra, and maximum height roughness Rz.
Figure 8:
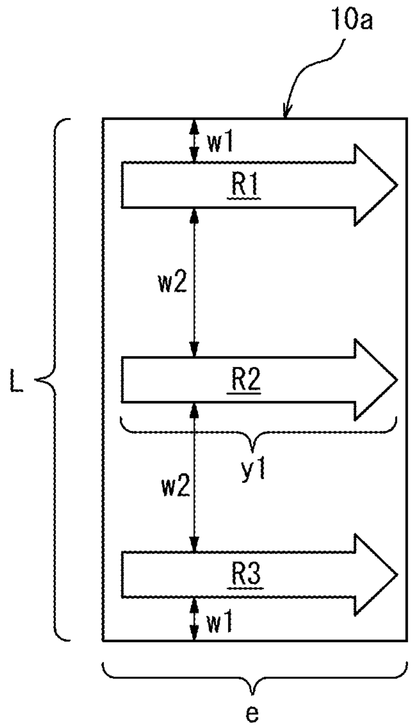
FIG. 8 is a diagram illustrating locations for measurement of flatness, arithmetic mean roughness Ra, and maximum height roughness Rz.

Here, the "flatness" refers to the sum of absolute values of the maximum value and the minimum value of a cross-sectional curve measured in accordance with JIS B 0601:2001. However, when the maximum value of the cross-sectional curve contains a noise peak, the maximum peak height Rp of the roughness curve is designated as the maximum value. Furthermore, when the minimum value of the cross-sectional curve contains a noise peak, the peak is not included in the calculation of flatness. For each of the split surfaces of the split pieces 1*a*, 1*b* (a total of four surfaces in the example in FIGS. 1 and 2), the cross-sectional curve is measured along the lamination direction of the thin strips of soft magnetic metal (direction across the laminate of thin strips of soft magnetic metal; the radial direction of the annular magnetic body for noise control 100) using a SURFCOM, 1400G surface roughness measuring device manufactured by Tokyo Seimitsu Co., Ltd. Details of the locations for measurement are described using FIGS. 7 and 8. As illustrated in FIG. 7, measurement is made at least at the three locations of upper part R1, R1', middle part R2, R2', and lower part R3, R3' per split surface for the plurality of split surfaces 10*a*, 10*a*' of each split piece 1*a*. FIG. 8 is used to illustrate the locations for measurement of flatness in a case in which the split surface 10*a* has an area of 50 mm$^2$, with a width of the thin strips of soft magnetic metal (corresponding to the height in the central axis direction of the annular magnetic body for noise control 100) of L=10 mm and a length of the thin strips of soft magnetic metal in the lamination direction (corresponding to half the thickness of the difference between the inner and outer diameters of the annular magnetic body for noise control 100) of e=5 mm. As illustrated in FIG. 8, when the width L of the thin strips of soft magnetic metal at the split surface 10*a* is 3 mm<L<15 mm, the cross-sectional curve is measured at three locations, i.e., (1) the upper part R1, where w1=1 mm inward from the width L direction edge of the thin strips of soft magnetic metal at the split surface 10*a*, (2) the central part R2 in the width L direction of the thin strips of soft magnetic metal at the split surface 10*a* (where w2 is an equal distance from R1 and R3), and (3) the lower part R3, where w1=1 mm inward from the other width L edge of the thin strips of soft magnetic metal at the split surface 10*a*. The flatness is determined from these cross-sectional curves. As exceptions, if the width L of the thin strips of soft magnetic metal is 2 mm<L≤3 mm, the cross-sectional curve is measured at two locations, i.e., the upper parts R1, R1' where w1=1 mm inward from the width L direction edge, and the lower parts R3, R3' where w1=1 mm inward from the other width L edge, and if L=2 mm, the cross-sectional curve is measured at one location, i.e., at the centerline of the width of the thin strips of soft magnetic metal. If the width L of the thin strips of soft magnetic metal is 15 mm or more, additional locations for measurement are added at 5 mm intervals. Next, the measurement length of the cross-sectional curve is described. The measurement length y1 in the lamination direction of the thin strips of soft magnetic metal at the split surface 10*a* is 4 mm in accordance with JIS B 0601:2001. The cross-sectional curve is measured at the central part of the length e in the lamination direction of the thin strips of soft magnetic metal at the split surface 10*a*. If the length e in the lamination direction of the thin strips of soft magnetic metal at the split surface 10*a* is 8 mm or more, additional locations for measurement are added every 4 mm. If additional locations for measurement cannot be added every 4 mm, measurement is made at 4 mm in the central part of the length e in the lamination direction. Also, if the split surface is not straight but rather is curved or has a step, the measurement length is the lamination direction of the thin strips of soft magnetic metal, and the surface of the thin strips of soft magnetic metal is not included in the locations for measurement. In a case in which the annular magnetic body for noise control 100 consists of two split pieces 1*a*, 1*b*, the average of the sum of the absolute values of the maximum value and the minimum value of the cross-sectional curve at a total of 12 locations is the flatness of the split surfaces 10*a*, 10*b*. The dimensions of the split surface 10*a* of the annular magnetic body for noise control 100 are measured in the same way as the method of measuring the dimensions of the annular magnetic body for noise control 100 as described below.

In the present application, the cut surfaces can be polished to adjust the flatness of the split surfaces 10*a*, 10*b* obtained after polishing. The flatness can be adjusted by factors such as the grit size of the coated abrasive used for polishing. When a protective layer is applied to the split surfaces 10*a*, 10*b* using a rust inhibitor, film sheet, or the like, as described below, the flatness of the split surfaces 10*a*, 10*b* is measured after the protective layer is applied.

The coercivity of the split pieces 1*a*, 1*b* is the average of three measurements taken using an Automatic Coercivity Meter K-HC1000 manufactured by Tokyo Tokushuko. The coercivity is measured after placing the split surfaces of the split pieces 1*a*, 1*b* in contact with each other to form an annular shape. The coercivity of the split pieces 1*a*, 1*b* can be adjusted by the material properties of the thin strips of soft magnetic metal, the temperature and time of heat treatment on the thin strips of soft magnetic metal, the method of splitting (cutting) the annular magnetic body for noise control 100, and the polishing conditions of the cut surfaces.

The flatness FL is not limited, as long as adjustments are made so that the product FL×Hc of the flatness FL of the split surfaces 10*a*, 10*b* and the coercivity Hc of the split pieces is 7.0 μm·A/m or less. The flatness is preferably 1.5 μm or less, and more preferably 0.7 μm or less. No particular lower limit is placed on the flatness, but from the perspective of mass production by machining, the flatness is preferably 0.05 μm or more.

The coercivity Hc is also not limited, as long as adjustments are made so that the product FL×Hc of the flatness FL of the split surfaces 10*a*, 10*b* and the coercivity Hc of the split pieces is 7.0 μm·A/m or less. The coercivity Hc is preferably 7.0 A/m or less, and more preferably 5.0 A/m or less. No particular lower limit is placed on the coercivity, but since the coercivity varies depending on the material properties of the thin strips of soft magnetic metal and the polishing conditions of the cut surfaces, the coercivity is preferably 0.1 A/m or more.

The annular magnetic body for noise control 100 includes a plurality of split pieces 1*a*, 1*b* divided into a non-annular shape. The number and size of the split pieces composing the annular magnetic body for noise control 100 are not particularly limited. As illustrated in FIGS. 1 and 2, the annular magnetic body for noise control 100 may be composed of two split pieces 1*a*, 1*b*, or may be composed of a larger number of split pieces. The annular magnetic body for noise control 100 may be split in any way as long as the overall shape of the split pieces 1*a*, 1*b* is non-annular. In one example, the annular magnetic body for noise control 100 is split in parallel to the central axis direction. The central axis direction refers to the direction on a straight line extending perpendicular to the radial direction from the center of the annular magnetic body for noise control 100. For example, the split pieces 1*a*, 1*b* can be in the shape of the annular magnetic body for noise control 100 divided along the radial direction. According to this configuration, a cable can be inserted through the annular magnetic body for noise control 100 even when the cable is connected to an electronic device, electronic components, and the like. The annular magnetic body for noise control 100 can thus be easily attached to the cable. After the plurality of split pieces 1*a*, 1*b* are placed in contact with each other, they may be adhered together to prevent them from moving, or they may be fixed to each other with a split-type core case, band, or the like, as described below.

The thin strips of soft magnetic metal that form the annular magnetic body for noise control 100 are not particularly limited. In order to obtain an excellent noise reduction effect, a soft magnetic material with low coercivity and high impedance relative permeability is preferred. In order to obtain a particularly excellent noise reduction effect, the thin strips of soft magnetic metal that form the annular magnetic body for noise control 100 more preferably have an impedance relative permeability μrz at a frequency of 100 kHz of 6000 or more, even more preferably 12000 or more. In order to obtain a particularly excellent noise reduction effect, the thin strips of soft magnetic metal that form the annular magnetic body for noise control 100 preferably have a coercivity of 7.0 A/m or less.

As soft magnetic materials, ferrites such as Mn—Zn ferrites, Ni—Zn ferrites, and Ni—Zn—Cu ferrites; soft magnetic metals such as Fe—Ni alloys (permalloy) and Fe—Si alloys (silicon steel); amorphous alloys such as Co-based amorphous alloys and Fe-based amorphous alloys; Fe-based amorphous alloys; Fe-based nanocrystalline alloys; and the like can be used.

The thin strips of soft magnetic metal that form the annular magnetic body for noise control 100 are preferably an Fe-based nanocrystalline alloy. When the thin strips of soft magnetic metal that form the annular magnetic body for noise control 100 are an Fe-based nanocrystalline alloy, for example, an Fe-based nanocrystalline alloy having the general formula represented as follows is particularly preferable: $(Fe_{1-a}M_a)_{100-x-y-z-b-c-d}A_xM'_yM''_zX_bSi_cB_d$ (atomic %) (where in the formula M is at least one element selected from Co and Ni, A is at least one element selected from Cu and Au, M' is at least one element selected from Ti, V, Zr, Nb, Mo, Hf, Ta, and W, M" is at least one element selected from Cr, Mn, Sn, Zn, Ag, In, platinum-group elements, Mg, N, and S, X is at least one element selected from C, Ge, Ga, Al, and P, and a, x, y, z, b, c, and d are numbers respectively satisfying $0 \le a \le 0.1$, $0.1 \le x \le 3$, $1 \le y \le 10$, $0 \le z \le 10$, $0 \le b \le 10$, $11 \le c \le 17$, and $3 \le d \le 10$). The composition of the Fe-based nanocrystalline alloy is not particularly limited but is preferably, in atomic %, Cu: 0.5% to 2.0%, Nb: 1.0% to 5.0%, Si: 11.0% to 15.0%, and B: 5.0% to 10.0%, with the balance substantially consisting of Fe.

In order to obtain an excellent noise reduction effect, the arithmetic mean roughness Ra of the split surfaces 10*a*, 10*b* preferably satisfies Ra≤0.7 μm and more preferably satisfies Ra≤0.35 μm. No particular lower limit is placed on the arithmetic mean roughness Ra of the split surfaces 10*a*, 10*b*. The arithmetic mean roughness Ra of the split surfaces 10*a*, 10*b* can be adjusted by polishing the cut surfaces. The arithmetic mean roughness Ra of the split surfaces 10*a*, 10*b* can be adjusted by the grit size of the coated abrasive used for polishing, the number of abrasive particles in the polishing suspension (liquid with suspended abrasive particles for polishing), the material of the abrasive particles, and the like.

In order to obtain an excellent noise reduction effect, the maximum height roughness Rz of the split surfaces 10*a*, 10*b* preferably satisfies Rz≤10 μm and more preferably satisfies Rz≤5 μm. No particular lower limit is placed on the maximum height roughness Rz of the split surfaces 10*a*, 10*b*. The maximum height roughness Rz of the split surfaces 10*a*, 10*b* can be adjusted by polishing the split surfaces 10*a*, 10*b*. The maximum height roughness Rz of the split surfaces 10*a*, 10*b* can be adjusted by the grit size of the coated abrasive used for polishing, the number of abrasive particles in the polishing suspension, the material of the abrasive particles, and the like.

The arithmetic mean roughness Ra and the maximum height roughness Rz of the split surfaces 10*a*, 10*b* are measured using a SURFCOM, 1400G surface roughness measuring device, manufactured by Tokyo Seimitsu Co., Ltd, at least at three locations for measurement on each of the split surfaces of the split pieces 1*a*, 1*b* (four surfaces in total in the examples in FIGS. 1 and 2), and the average of at least a total of 12 locations is taken as the arithmetic mean roughness Ra and the maximum height roughness Rz of the split surfaces 10*a*, 10*b*. The locations for measurement of the arithmetic mean roughness Ra and maximum height roughness Rz are the same as those for flatness as described above.

The radial crushing strength of the annular magnetic body for noise control 100 is preferably 50 MPa or more. By the radial crushing strength being 50 MPa or more, the annular magnetic body for noise control 100 is easier to handle when polishing the split surfaces 10*a*, 10*b*, and the split pieces 1*a*, 1*b* can be placed in contact with each other while appropriate surface pressure is applied to the split pieces. The radial crushing strength of the annular magnetic body for noise control 100 is more preferably 70 MPa or higher to facilitate the polishing and cutting process and to maintain the shape more easily. The radial crushing strength of the annular magnetic body for noise control 100 has no particular upper limit but may be 800 MPa or less.

Figure 6:
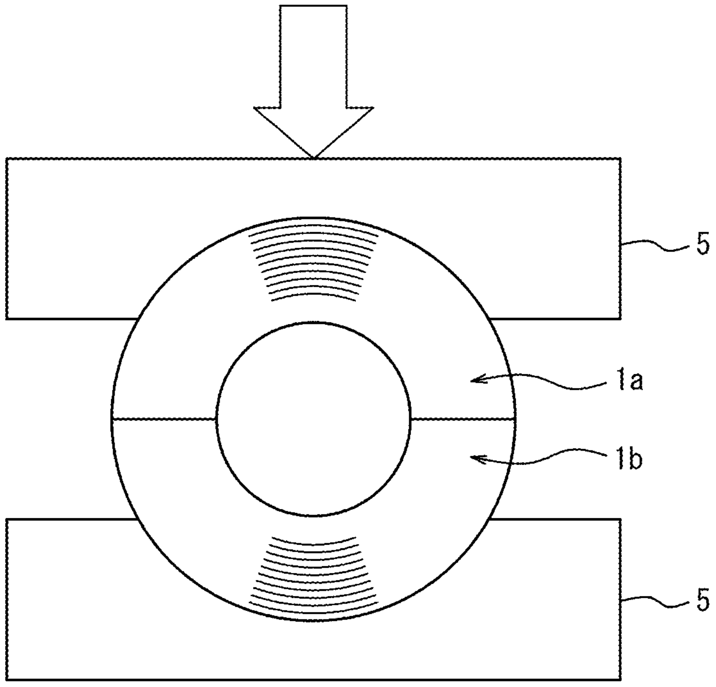
FIG. 6 is a diagram illustrating a method of measuring the radial crushing strength of an annular magnetic body for noise control.

The radial crushing strength is measured as follows. As illustrated in FIG. 6, using a jig 5 that matches the diameter of the annular magnetic body for noise control 100, the split surfaces 10*a*, 10*b* of the split pieces 1*a*, 1*b* of the annular magnetic body for noise control 100 are fixed so as to be in contact with each other, and while the split surfaces 10*a*, 10*b* are compressed vertically, an autograph AGX-20kNBVD manufactured by SHIMADZU is used to measure the radial crushing strength. The radial crushing strength $K=F(D-e)/Le^2$ is calculated, where F is the maximum load at which cracking occurs. Here, as illustrated in FIG. 2, D, L, and e are the outer diameter D, height L, and half thickness e of the inner/outer diameter difference (difference between the outer diameter D and the inner diameter d) of the annular magnetic body for noise control 100, respectively. The dimensions of the annular magnetic body for noise control 100 are measured by the method described below.

The radial crushing strength of the annular magnetic body for noise control 100 can be adjusted by applying resin coating or by wrapping insulation tape around the annular magnetic body for noise control 100, as well as by the type of thin strips of soft magnetic metal that form the annular magnetic body for noise control 100. The annular magnetic body for noise control 100 may be impregnated with resin to increase the radial crushing strength. Epoxy resins, acrylic resins, or mixtures thereof are preferred as resin coatings or resin impregnating agents.

The impedance relative permeability μrz of the annular magnetic body for noise control 100 at a frequency of 100 kHz is preferably 6000 or more, more preferably 8000 or more, and even more preferably 12000 or more. No particular upper limit is placed on of the impedance relative permeability μrz at a frequency of 100 kHz of the annular magnetic body for noise control 100.

The impedance relative permeability μrz of a conventional split-type ferrite core at a frequency of 100 kHz is about 4000. In contrast, in the annular magnetic body for noise control 100 of the present disclosure, an impedance relative permeability μrz of 6000 or more, which is about 1.5 times the conventional value, and more preferably, an impedance relative permeability μrz of 8000 or more, which is about 2.0 times that of the current split-type ferrite core, is obtained. In the annular magnetic body for noise control 100 according to the present disclosure, the noise suppression effect is far greater than that of the current split-type ferrite core, thereby contributing to a reduction in size and weight of the annular magnetic body for noise control 100. The cables for electronic components provided in automobiles, or for power generators, power supply apparatuses, communication devices, and the like are wired in a narrow space. In addition, electronic devices such as inverters and converters for industrial machinery have become smaller in recent years and are therefore often wired within narrow spaces. In order to obtain an excellent noise reduction effect in a conventional split-type ferrite core, it was necessary to increase the number of cable windings for enhancement of the noise reduction effect, or to increase the volume occupied by the magnetic material. In contrast, the annular magnetic body for noise control 100 according to the present disclosure has a far greater noise suppression effect than the current split-type ferrite cores and can be reduced in size and weight, making it particularly effective for attachment to cables for electronic components provided in automobiles, or for power generators, power supply apparatuses, communication devices, and the like, and cables for electronic devices such as inverters and converters for industrial machinery. The annular magnetic body for noise control 100 suppresses the noise generated inside or outside these electronic components and electronic devices and propagated through the cables.

The impedance relative permeability at a frequency of 100 kHz is measured as follows. A 4294A impedance analyzer manufactured by Keysight is used to measure the impedance relative permeability. A 0.5 mm diameter single wire lead (H-PVC manufactured by Tanaka Densen) is passed through the annular magnetic body for noise control 100 once, and measurement is made taking the surface pressure on the split surfaces 10*a*, 10*b* as 0.1 MPa using a fixture for the lead wire (16047E, manufactured by Keysight).

The overall shape of the annular magnetic body for noise control 100 is not particularly limited as long as the shape is annular. In addition to the perfect cylinder illustrated in FIG. 1 (the external shape of a cross-section perpendicular to the central axis direction being a perfect ring), the annular magnetic body for noise control 100 can, for example, be an elliptical cylinder (the shape of a cross-section perpendicular to the central axis direction being an elliptical ring), a square cylinder (the shape of a cross-section perpendicular to the central axis direction being a square ring), or a rounded square cylinder (the shape of a cross-section perpendicular to the central axis direction being a rounded square ring). The shape of the split pieces 1*a*, 1*b* is determined by the overall shape of the annular magnetic body for noise control 100 and the manner in which the magnetic body is split. For example, if the overall shape of the annular magnetic body for noise control 100 is a perfect cylinder or a perfect ellipse, and the annular magnetic body for noise control 100 is divided symmetrically in half along the central axis direction, the split pieces 1*a*, 1*b* can have the shape of circular arcs. For example, if the overall shape of the annular magnetic body for noise control 100 is a rounded square cylinder, and the annular magnetic body for noise control 100 is divided symmetrically in half along the central axis direction, the split pieces 1*a*, 1*b* can be a rotated U-shape, a U-shape, or linear, depending on the overall shape of the annular magnetic body for noise control 100.

When the overall shape of the annular magnetic body for noise control 100 is not circular, the jig 5 in FIG. 6 is changed to a shape that matches the shape of the side parts of the annular magnetic body for noise control 100, and the radial crushing strength is measured. When the annular magnetic body for noise control 100 contains three or more split pieces, the radial crushing strength for the case in which the annular magnetic body for noise control 100 is divided symmetrically in half along the central axis direction is calculated and taken as the radial crushing strength of the annular magnetic body for noise control 100.

The dimensions of the annular magnetic body for noise control 100 are not particularly limited and can be set according to the application. In one example, the outer diameter D of the annular magnetic body for noise control 100 can be 10 mm or more and can be 300 mm or less. In one example, the inner diameter d of the annular magnetic body for noise control 100 can be 2 mm or more and can be 200 mm or less. The height L in the central axis direction of the annular magnetic body for noise control 100 can be 2 mm or more and can be 100 mm or less. When the annular magnetic body for noise control 100 is not a perfect ring, the outer diameter D and inner diameter d refer to the circle-equivalent outer diameter and circle-equivalent inner diameter, respectively. The dimensions of the annular magnetic body for noise control 100 are determined as the average of three measurements taken using calipers, a micrometer, and a microscope image.

FIGS. 1 and 2 illustrate an example of a straight type in which the split surfaces 10*a*, 10*b* of the split pieces 1*a*, 1*b* are parallel to the lamination direction of the thin strips of soft magnetic metal, but the shape of the split surfaces 10*a*, 10*b* of the split pieces 1*a*, 1*b* is not particularly limited. For example, the shape of the split surfaces 10*a*, 10*b* of the split pieces 1*a*, 1*b* may be a diagonal type. That is, the split surfaces 10*a*, 10*b* may intersect, rather than being parallel to, the lamination direction of the thin strips of soft magnetic metal. The split surfaces 10*a*, 10*b* may have a shape that intersects, rather than being parallel to, the central axis direction of the annular magnetic body for noise control 100. The shape of the split surfaces 10*a*, 10*b* of the split pieces 1*a*, 1*b* is not limited to a planar surface. That is, the shape of the split surfaces 10*a*, 10*b* of the split pieces 1*a*, 1*b* is not limited to a straight line between the start and end points of the split and is not dependent on the path of the split. When the split surfaces 10*a*, 10*b* are curved or have a step, the lamination direction of the thin strips of soft magnetic metal is the measurement length for flatness, arithmetic mean roughness Ra, and maximum height roughness Rz, and the lamination surface of the thin strips of soft magnetic metal is not included in the locations for measurement.

The split surfaces 10*a*, 10*b* may have a protective coating or the like by means of a rust inhibitor, film sheet, or the like. The sides (split sides) continuous with the outer circumferential portion of the split surfaces 10*a*, 10*b* of the annular magnetic body for noise control 100 may be protected by a resin coating or tape. The outer circumferential portion (edge) of the split surfaces 10*a*, 10*b* may be chamfered.

The annular magnetic body for noise control 100 is preferably used while being restrained with an appropriate load so that the surface pressure on the split surfaces 10*a*, 10*b* of the split pieces 1*a*, 1*b* is 0.05 MPa or more when the split surfaces 10*a*, 10*b* are place in contact with each other. With a conventional split-type ferrite core, the surface pressure on the split surfaces 10*a*, 10*b* was about 0.025 MPa. However, when the split-type annular magnetic body for noise control 100 is produced using a Fe-based nanocrystalline alloy as described above, the split surfaces 10*a*, 10*b* tend to be insufficiently controlled due to their high brittleness. Therefore, in addition to adjusting the surface roughness of the split surfaces 10*a*, 10*b* as described above, a particularly excellent noise reduction effect can be obtained during use by restraining with an appropriate load so that the surface pressure on the split surfaces 10*a*, 10*b* is 0.05 MPa or more. The surface pressure on the split surfaces 10*a*, 10*b* is more preferably 0.10 MPa or more. The upper limit of the surface pressure on the split surfaces 10*a*, 10*b* is not particularly limited but is preferably 5.0 MPa or less to suitably prevent deformation and breakage of the split surfaces 10*a*, 10*b* due to an excessive load.

The surface pressure on the split surfaces 10*a*, 10*b* of the split pieces 1*a*, 1*b* is measured as follows. A prescale sheet manufactured by Fujifilm is placed between the split surfaces 10*a*, 10*b* of the split pieces 1*a*, 1*b*, which are then placed in contact, and the surface pressure is measured for 2 minutes.

To place the split surfaces 10*a*, 10*b* of the split pieces 1*a*, 1*b* of the annular magnetic body for noise control 100 in contact with each other so that the surface pressure applied to the split surfaces 10*a*, 10*b* is 0.05 MPa or more, a band or the like can be wrapped around the circumference of the annular magnetic body for noise control 100 after the split surfaces 10*a*, 10*b* of the split pieces 1*a*, 1*b* are placed in contact with each other, for example. Alternatively, the annular magnetic body for noise control 100 can be stored in a split-type core case in which subcases formed by dividing a cylinder into a non-annular shape are connected in an openable and closable manner to form a cylindrical shape, and the surface pressure on the split surfaces 10*a*, 10*b* in the split-type core case can be adjusted to be 0.05 MPa or higher. The following describes a member for noise control that includes the above-described annular magnetic body for noise control 100.

[Member for Noise Control]

A member for noise control according to an embodiment may include:

- an annular magnetic body for noise control, and
- a split-type core case in which subcases formed by dividing a cylinder into a non-annular shape are connected in an openable and closable manner to form a cylindrical shape, the subcases storing the split pieces of the annular magnetic body for noise control one by one, wherein
- when the split-type core case is closed, the split surfaces of the split pieces may come in contact with each other inside the split-type core case to form the annular magnetic body for noise control, and a surface pressure on the split surfaces may be 0.05 MPa or more.

Figure 3:
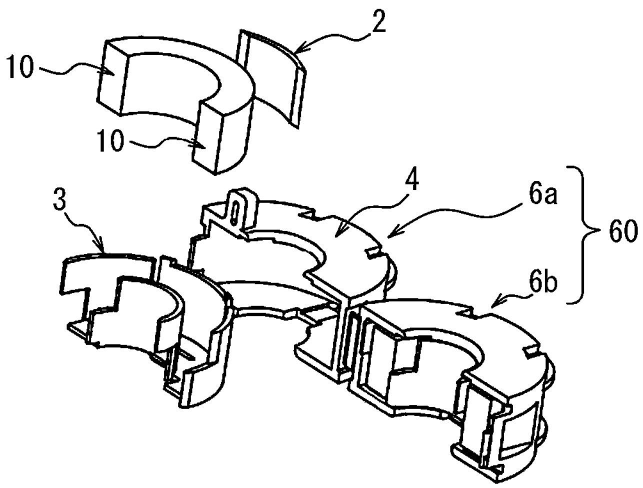
FIG. 3 is a diagram illustrating an example of a member for noise control.
Figure 4:
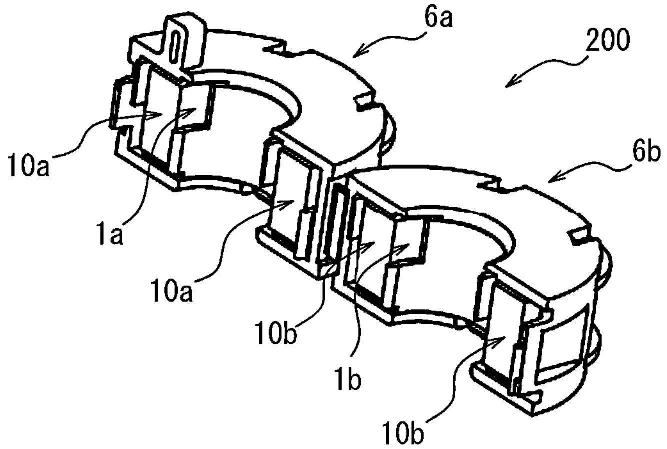
FIG. 4 is a diagram illustrating an example of a member for noise control in an open state.
Figure 5:
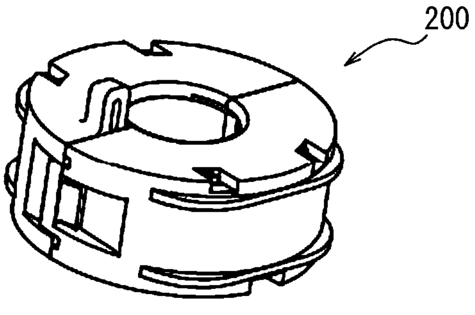
FIG. 5 is a diagram illustrating an example of a member for noise control in a closed state.

FIGS. 3 to 5 are used to describe a member for noise control according to an embodiment. FIGS. 3 to 5 are diagrams illustrating an example of a member for noise control. As illustrated in FIGS. 3 to 5, the member for noise control 200 has the annular magnetic body for noise control 100 and a split-type core case 60 that stores the annular magnetic body for noise control 100. The split-type core case 60 includes subcases 6*a*, 6*b* that are formed by dividing a cylinder into a non-annular shape and are connected by hinges or the like in an openable and closable manner to form a cylindrical shape. In one example, the split-type core case 60 includes subcases 6*a*, 6*b* that are formed by dividing a cylinder parallel to the central axis direction and are connected by hinges or the like in an openable and closable manner to form a cylindrical shape. In the examples in FIGS. 3 to 5, the subcases 6*a*, 6*b* are illustrated in the form of a cylinder divided in half along the central axis direction, but the number and form of the subcases 6*a*, 6*b* configuring the split-type core case 60 are not particularly limited. The subcases 6*a*, 6*b* store the split pieces 1*a*, 1*b* of the annular magnetic body for noise control 100 one by one (i.e. respectively).

As illustrated in the examples in FIGS. 3 to 5, the subcases 6*a*, 6*b* may have a double structure with an inner case 3 and an outer case 4. The inner case 3 has an inner wall that protects the inner circumferential holes of the annular magnetic body for noise control 100. The outer case 4 has an outer wall that protects the outer circumferential portion, a bottom plate that protects the bottom surface, and a top plate that functions to protect the top surface of the annular magnetic body for noise control 100. The subcases 6*a* and 6*b* can be connected by hinges. In the examples illustrated in FIGS. 3 to 5, double-sided tape 2 of cushioning acrylic foam is used to secure each of the split pieces 1*a*, 1*b* to the inner case 3. The inner case 3 is inserted into the outer case 4. The split surfaces 10*a*, 10*b* of the split pieces 1*a*, 1*b* are exposed by opening the outer case before attachment to the cable.

When the split-type core case 60 is closed, the split surfaces 10*a*, 10*b* of the split pieces 1*a*, 1*b* contact each other inside the split-type core case 60 to form the above-described annular magnetic body for noise control 100. At this time, the surface pressure on the split surfaces 10*a*, 10*b* is preferably 0.05 MPa or more. As described above, a particularly excellent noise reduction effect can be obtained during use by restraining with an appropriate load so that the surface pressure on the split surfaces 10*a*, 10*b* is 0.05 MPa or more. The surface pressure on the split surfaces 10*a*, 10*b* is more preferably 0.10 MPa or more when the split-type core case 60 is closed. The upper limit of the surface pressure on the split surfaces 10*a*, 10*b* when the split-type core case 60 is closed is not particularly limited but is preferably 5.0 MPa or less to suitably prevent deformation and breakage of the split surfaces 10*a*, 10*b* due to excessive loads.

The surface pressure on the split surfaces 10*a*, 10*b* of the split pieces 1*a*, 1*b* when the split-type core case 60 is closed is measured as follows. The split-type core case 60 in closed by folding about the hinges, and a prescale sheet manufactured by Fujifilm is placed between the split surfaces 10*a*, 10*b* of the split pieces 1*a*, 1*b*, which are then placed in contact. A sustained surface pressure measurement is made for 2 minutes with the split-type core case 60 closed.

The fact that the core case is a split-type core case 60 facilitates attachment to and removal from the cable, and the split-type core case 60 can be retrofitted and removed even while the cable is connected. Therefore, the amount of noise attenuation can be adjusted by attaching and detaching the split-type core case 60 even while an electronic device or the like is in use.

The material of the split-type core case 60 is not particularly limited. For example, polypropylene (PP), polyethylene terephthalate (PET), polybutylene terephthalate (PBT), polyamide (PA), and polyphenylene sulfide (PPS); silicone resin and silicone-based elastomer; and the like can be used. Materials that contain glass fiber (GF), carbon fiber (CF), graphite (GP), and the like to improve strength and heat resistance can also be included in the aforementioned thermoplastics.

[Manufacturing Method]

The method of manufacturing the annular magnetic body for noise control 100 according to the present disclosure is not particularly limited. For example, a thin strip of amorphous alloy with a thickness of 5 μm to 50 μm may be obtained from a molten alloy by a single roll method or the like and may then be rolled into a cylindrical shape and heat treated at a temperature between of 300° C. or more to 700° C. or less for 5 minutes to 20 minutes to obtain an annular magnetic body made of an Fe-based nanocrystalline alloy. The annular magnetic body is cut into a non-annular shape to obtain the split pieces 1*a*, 1*b*. The cut surfaces of the split pieces 1*a*, 1*b* are polished using coated abrasive to obtain the annular magnetic body for noise control 100 having split surfaces 10*a*, 10*b* with a predetermined surface roughness.

Before cutting of the aforementioned annular magnetic body, the annular magnetic body for noise control 100 may be impregnated with resin to increase the radial crushing strength. For example, the annular magnetic body is immersed in a solution of epoxy resin and hardener mixed in a specified quantity ratio, a vacuum is drawn at 0.1 MPa or less, and this state is maintained for about 15 minutes. Subsequently, pressure is returned to atmospheric pressure, and the annular magnetic body is impregnated with the resin. The resin-impregnated annular magnetic body is left in the air at room temperature for about 24 hours to cure. The annular magnetic body after impregnation with resin is cut into a non-annular shape according to the above-described method to obtain the split pieces 1*a*, 1*b*. Subsequently, the cut surfaces of the split pieces 1*a*, 1*b* are polished using coated abrasive to obtain the annular magnetic body for noise control 100 having split surfaces 10*a*, 10*b* with a predetermined surface roughness.

After polishing of the split surfaces 10*a*, 10*b*, a protective coating or the like may be formed on the split surfaces 10*a*, 10*b* by means of a rust inhibitor, film sheet, or the like. The sides (split sides) continuous with the split surfaces 10*a*, 10*b* may be protected by a resin coating or tape. In addition, the outer circumferential portion (edge) of the split surfaces 10*a*, 10*b* may be chamfered.

The present disclosure is described below through examples, but the present disclosure is not limited to these examples.

EXAMPLES

Examples 1_1 to 1_7

An annular magnetic body for noise control like the one illustrated in FIG. 1 was prepared. First, thin strips of Fe-based amorphous alloy with a width of 10 mm and a thickness of 20 μm were obtained by using the single roll method to quench molten alloy metal consisting, in atomic %, of Cu: 1%, Nb: 3%, Si: 13.5%, and B: 9%, with the balance substantially consisting of Fe. The Fe-based amorphous alloy was wound to form a cylindrical shape with an outer diameter of 28.5 mm, an inner diameter of 18.0 mm, and a height of 10 mm. The cylindrical Fe-based amorphous alloy was inserted into a heat treatment furnace kept at 490° C. under an argon atmosphere and was subjected to heat treatment for 10 minutes. An annular magnetic body made of Fe-based nanocrystalline alloy was then prepared. The obtained annular magnetic body was immersed in a solution of epoxy resin and hardener mixed in a specified quantity ratio, a vacuum was drawn at 0.1 MPa or less, and this state was maintained for 15 minutes. Subsequently, pressure was returned to atmospheric pressure, and the annular magnetic body was impregnated with the resin. The resin-impregnated annular magnetic body was left in the air at room temperature for 24 hours to cure. After resin impregnation, the annular magnetic body was split in half along the radial direction to form a semicircular shape as illustrated in FIG. 1. The cut surfaces of the annular magnetic body were polished by starting with abrasive paper #400 and gradually increasing the fineness of the abrasive paper. The cut surfaces were polished up to a 0.5 μm alumina film for Example 1_1, up to a 1.0 μm alumina film for Example 1_2, up to #2500 for Example 1_3, up to #2000 for Example 1_4, and up to #800 for Examples 1_5 to 1_7, respectively, to obtain annular magnetic bodies for noise control having split surfaces with a predetermined surface roughness.

The obtained annular magnetic bodies for noise control were evaluated for impedance relative permeability, coercivity, surface roughness (flatness, Ra, Rz), surface pressure on the split surfaces, and radial crushing strength according to the methods described above. Table 1 lists the results.

Examples 2_1 to 2_3

The surface pressure on the split surfaces of the split pieces forming annular magnetic bodies for noise control, prepared in the same way as in Example 1_2, was varied, and the impedance relative permeability was measured according to the method described above. The resulting relationship between the impedance relative permeability and surface pressure is summarized in Table 2. For the resulting contact area, the portion of the split surface of the annular magnetic body for noise control that was colored at 0.05 MPa or more was treated as the effective cross-sectional area, and the coloring ratio was confirmed to be 50% or more.

Examples 3_1 to 3_5

In order to confirm the effect, on impedance relative permeability, of the resin impregnated into the annular magnetic body, an annular magnetic body for noise control was prepared in the same way as in Example 1_2, with the impregnated resin being the same epoxy resin as in Example 1_2 for Examples 3_1 to 3_4 and being a one-component acrylic resin for Example 3_5. In Examples 3_3 and 3_4, after resin impregnation, the annular magnetic body for noise control was soaked in epoxy resin separately, the excess epoxy resin was wiped off, and the epoxy resin was left to cure for about 24 hours at room temperature to coat the surface of the annular magnetic body for noise control with epoxy resin. After the resin impregnation or further surface coating with resin, the annular magnetic body for noise control was produced under the same conditions as in Example 1_2. The radial crushing strength and impedance relative permeability of the produced annular magnetic body for noise control were determined according to the methods described above. Table 3 lists the results.

Comparative Examples 1_1 to 1_7

Annular magnetic bodies for noise control were prepared in the same manner as in Example 1_1, except that the split surfaces were polished differently: up to #400 in Comparative Examples 1_1 and 1_2, up to #220 in Comparative Examples 1_3 and 1_4, and not at all in Comparative Example 1_7. The obtained annular magnetic bodies for noise control were evaluated for impedance relative permeability, coercivity, surface roughness (flatness, Ra, Rz), surface pressure on the split surfaces, and radial crushing strength according to the methods described above. Table 1 lists the results. In addition, the impedance relative permeability, coercivity, surface roughness (flatness, Ra, Rz), surface pressure on the split surfaces, and radial crushing strength were evaluated according to the methods described above for conventional Mn—Zn ferrite in Comparative Example 1_5 and conventional Ni—Zn ferrite in Comparative Example 1_6. Table 1 lists the results.

Comparative Examples 2_1 and 2_2

The surface pressure on the split surfaces of the split pieces forming annular magnetic bodies for noise control, prepared under the same conditions as in Example 1_2, was varied, and the impedance relative permeability, coercivity, and flatness were measured according to the methods described above. Table 2 lists the results.

Comparative Examples 3_1 to 3_4

Annular magnetic bodies were prepared under the same conditions as Examples 1_1 to 1_5, except for the use of polyester resin as the resin impregnating agent, and the impedance relative permeability, coercivity, and flatness were measured according to the methods described above. Table 3 lists the results.

TABLE 1

| Sample name | Finishing number | Magnetic body | μrz 0.10 MPa | Surface roughness of split surface (μm) Ra | Rz | Flatness | Coercivity Hc A/m | Flatness*Hc μm*A/m |
|---|---|---|---|---|---|---|---|---|
| Example 1_1 | 0.5 μm alumina film | nanocrystalline | 14400 | 0.1 | 1 | 0.5 | 2.0 | 1.0 |
| Example 1_2 | 1.0 μm alumina film | nanocrystalline | 9700 | 0.3 | 1 | 1.1 | 2.0 | 2.2 |
| Example 1_3 | #2500 | nanocrystalline | 10700 | 0.1 | 2 | 0.9 | 2.1 | 2.0 |
| Example 1_4 | #2000 | nanocrystalline | 12900 | 0.2 | 3 | 0.4 | 2.0 | 0.8 |
| Example 1_5 | #800 | nanocrystalline | 6800 | 0.1 | 2 | 1.5 | 4.1 | 6.2 |
| Example 1_6 | #800 | nanocrystalline | 6400 | 0.6 | 6 | 2.2 | 2.7 | 5.8 |
| Example 1_7 | #800 | nanocrystalline | 6500 | 0.5 | 9 | 2.1 | 2.6 | 5.0 |
| Comparative Example 1_1 | #400 | nanocrystalline | 5700 | 0.3 | 4 | 1.7 | 4.6 | 7.2 |

TABLE 1-continued

| Sample name | Finishing number | Magnetic body | μrz 0.10 MPa | Surface roughness of split surface (μm) Ra | Rz | Flatness | Coercivity Hc A/m | Flatness*Hc μm*A/m |
|---|---|---|---|---|---|---|---|---|
| Comparative Example 1_2 | #400 | nanocrystalline | 5500 | 0.8 | 9 | 1.8 | 2.4 | 4.3 |
| Comparative Example 1_3 | #220 | nanocrystalline | 5800 | 0.6 | 11 | 1.9 | 2.6 | 4.9 |
| Comparative Example 1_4 | #220 | nanocrystalline | 5200 | 0.3 | 5 | 2.6 | 3.2 | 8.3 |
| Comparative Example 1_5 | — | Mn—Zn ferrite | 3400 | 1.0 | 8 | 4.5 | 4.5 | 20.2 |
| Comparative Example 1_6 | — | Ni—Zn ferrite | 1000 | 0.4 | 3 | 2.3 | 17.7 | 41.2 |
| Comparative Example 1_7 | — | nanocrystalline | 1500 | 1.1 | 20 | 7.8 | 2.0 | 15.6 |

TABLE 2

| Sample name | μrz | Surface pressure MPa | Coercivity Hc A/m | Flatness*Hc μm*A/m |
|---|---|---|---|---|
| Example 2_1 | 12300 | 0.11 | 1.4 | 2.0 |
| Example 2_2 | 9000 | 0.07 | 2.7 | 3.3 |
| Example 2_3 | 9600 | 0.47 | 1.4 | 2.0 |
| Comparative Example 2_1 | 5800 | 0.03 | 1.3 | 2.5 |
| Comparative Example 2_2 | 5100 | 0.01 | 1.7 | 2.4 |

TABLE 3

| Sample name | Resin impregnating agent | Resin coating | μrz 0.10 MPa | Radial crushing strength MPa | Coercivity Hc A/m | Flatness*Hc μm*A/m |
|---|---|---|---|---|---|---|
| Example 3_1 | epoxy | none | 11400 | 90 | 2.2 | 3.8 |
| Example 3_2 | epoxy | none | 10000 | 90 | 1.4 | 2.0 |
| Example 3_3 | epoxy | coated | 10000 | 90 | 2.4 | 3.1 |
| Example 3_4 | epoxy | coated | 12700 | 100 | 1.7 | 1.1 |
| Example 3_5 | acrylic | none | 6200 | 51 | 2.4 | 3.4 |
| Comparative Example 3_1 | polyester | none | 5800 | 46 | 2.0 | 2.2 |
| Comparative Example 3_2 | polyester | none | 3000 | 34 | 2.4 | 3.9 |
| Comparative Example 3_3 | polyester | none | 4200 | 35 | 2.1 | 1.4 |
| Comparative Example 3_4 | polyester | none | 5500 | 45 | 2.6 | 3.9 |

From the above, it can be seen that by satisfying the conditions of the present disclosure, it is possible to produce a member for noise control with an impedance relative permeability μrz at a frequency of 100 kHz of 6000 or more.

INDUSTRIAL APPLICABILITY

The present member for noise control is particularly effective as an annular magnetic body for noise control that is attached to cables for electronic components provided in automobiles, or for power generators, power supply apparatuses, communication devices, OA/FA devices, and the like, to suppress the noise generated inside or outside these electronic components and electronic devices and propagated through the cables.

REFERENCE SIGNS LIST

1, 1*a*, 1*b* Split piece
10, 10*a*, 10*b* Split surface
100 Annular magnetic body for noise control
200 Member for noise control
2 Double-sided tape
3 Inner case
4 Outer case
5 Jig
6*a*, 6*b* Subcase
60 Split-type core case
11 Hollow section

The invention claimed is:

1. An annular magnetic body for noise control comprising thin strips of soft magnetic metal laminated along a radial direction, the annular magnetic body being used by having a cable inserted therethrough, wherein the annular magnetic body for noise control comprises a plurality of split pieces divided into a non-annular shape and is used by placing split surfaces of the split pieces in contact with each other to form an annular shape, a product FL×Hc of a flatness FL of the split surfaces and a coercivity Hc of the split pieces is 7.0 μm·A/m or less, where the flatness FL is a sum of absolute values of a maximum value and a minimum value of a cross-sectional curve measured in accordance with JIS B 0601:2001, an arithmetic mean roughness Ra and a maximum height roughness Rz of the split surfaces satisfy Ra≤0.7 μm and Rz≤10 μm, respectively, a radial crushing strength is 50 MPa or more, the soft-magnetic metal strips include an Fe-based nanocrystalline alloy, and a surface pressure on the split surfaces is 0.05 MPa or more.

2. The annular magnetic body for noise control according to claim 1, wherein an impedance relative permeability μrz at a frequency of 100 kHz is 6000 or more.

3. A member for noise control comprising:

the annular magnetic body for noise control according to claim 1; and a split-type core case in which subcases formed by dividing a cylinder into a non-annular shape are connected in an openable and closable manner to form a cylindrical shape, the subcases storing the split pieces of the annular magnetic body for noise control one by one, wherein when the split-type core case is closed, the split surfaces of the split pieces come in contact with each other inside the split-type core case to form the annular magnetic body for noise control.

* * * * *